March 1, 1966  L. M. ILGENFRITZ ETAL  3,237,580
SIGNAL CONTROLLED STEERING SYSTEM
Filed June 22, 1943  2 Sheets-Sheet 1
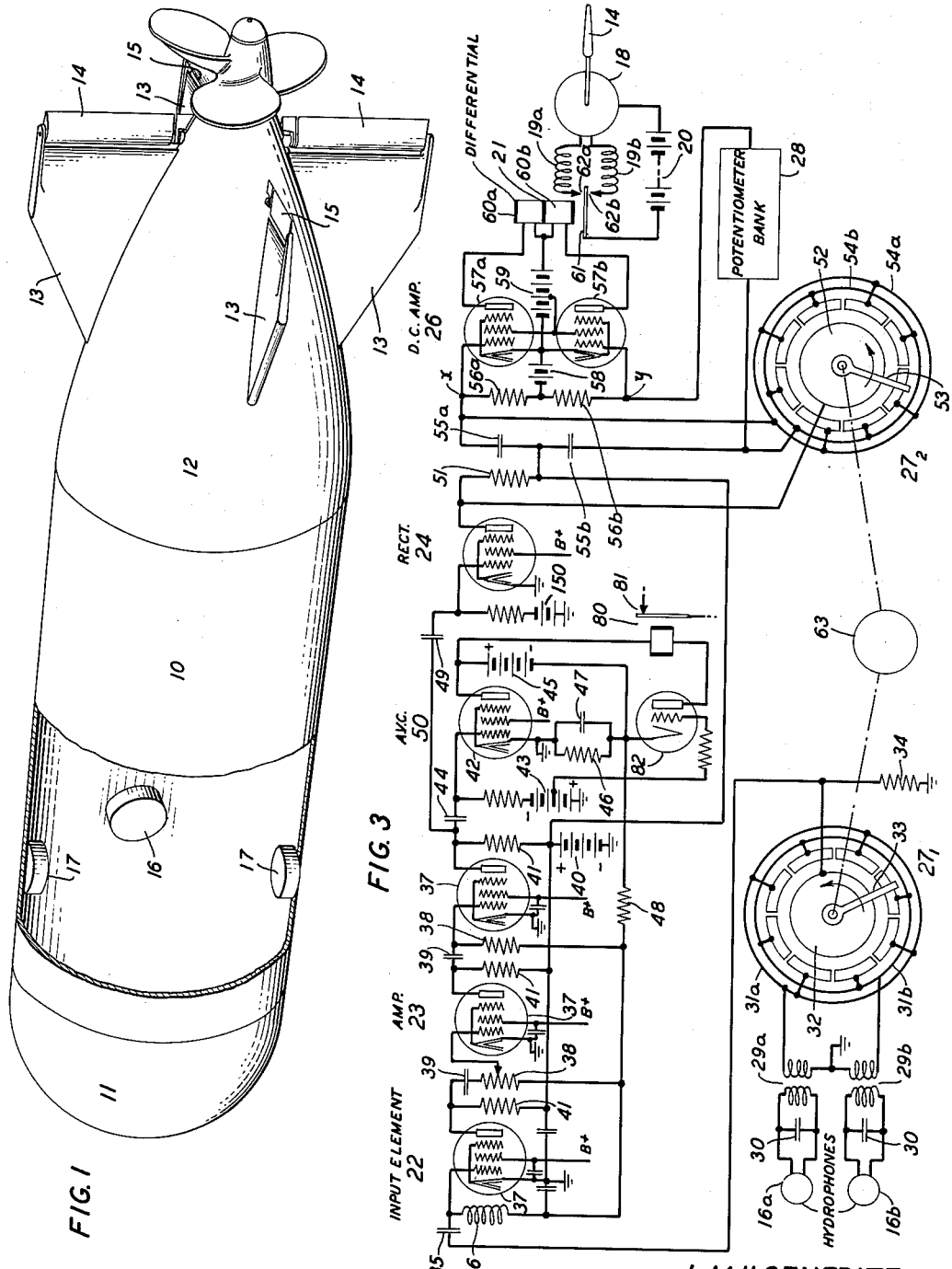
INVENTORS
L.M. ILGENFRITZ
H.R. MOORE
BY
Walter E. Kiesel
ATTORNEY March 1, 1966  L. M. ILGENFRITZ ETAL  3,237,580
SIGNAL CONTROLLED STEERING SYSTEM
Filed June 22, 1943  2 Sheets-Sheet 2
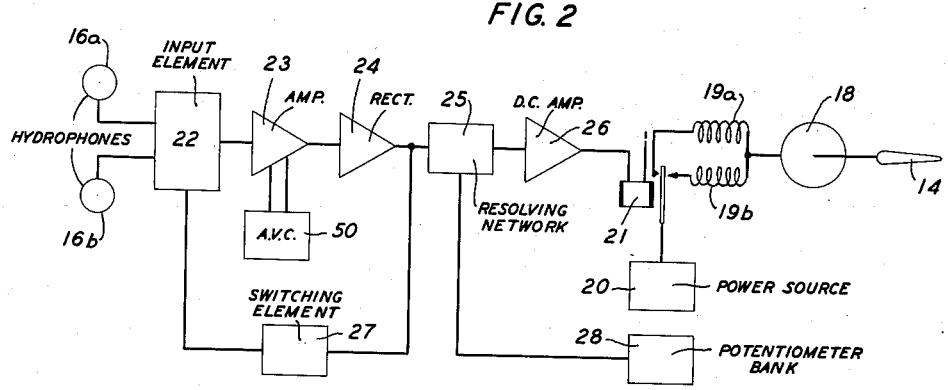
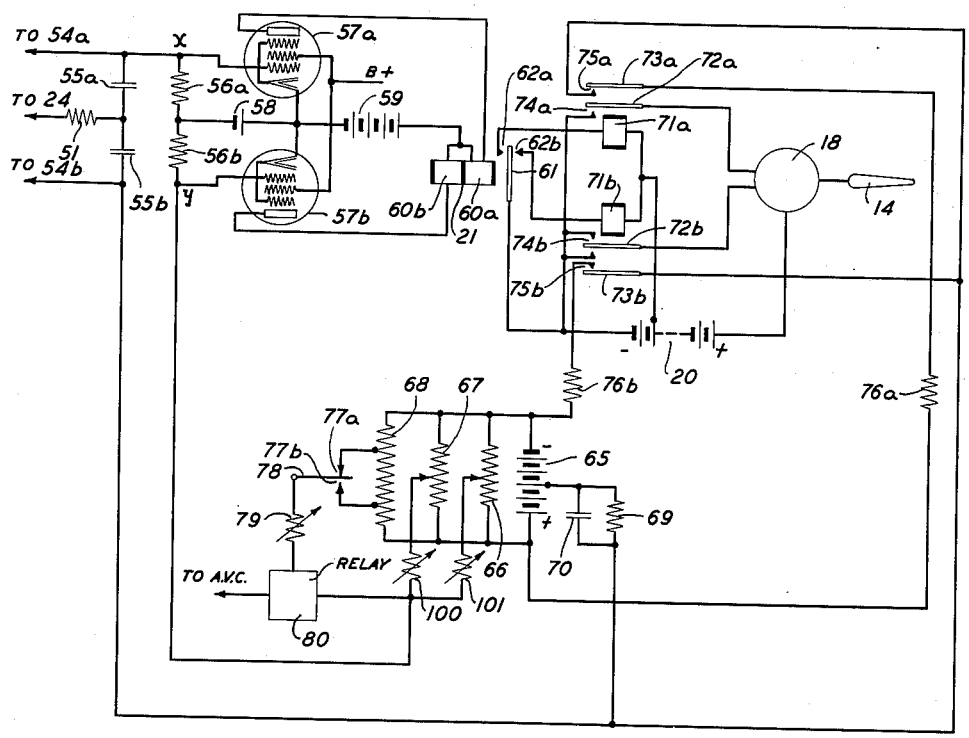
INVENTORS  L. M. ILGENFRITZ
H. R. MOORE
BY
Walter C. Kiesel
ATTORNEY United States Patent Office 3,237,580
Patented Mar. 1, 1966

3,237,580
SIGNAL CONTROLLED STEERING SYSTEM
Lester M. Ilgenfritz, Larchmont, N.Y., and Hilbert R. Moore, Pluckemin, N.J., assignors to Bell Telephone Laboratories, Incorporated, New York, N.Y., a corporation of New York
Filed June 22, 1943, Ser. No. 491,796
17 Claims. (Cl. 114—23)

This invention relates to signal controlled steering systems for moving bodies and more particularly to systems, such as disclosed in the application Serial No. 491,797, filed June 22, 1943, of John C. Steinberg, for guiding a torpedo toward an object, such as a submarine, in accordance with information derived from supersonic compressional wave signals emanating from the object.

One general object of this invention is to improve signal controlled steering systems for moving bodies such as torpedos.

More specifically, objects of this invention are to:

Simplify and facilitate the construction of signal controlled steering systems for moving bodies;

Increase the accuracy of the steering information derived from compressional wave signals received at a sonically guided torpedo;

Enable the automatic resolution of compressional wave signals received at a plurality of hydrophones in a sonically guided torpedo into a control signal the amplitude and polarity of which are accurately indicative of the position of the source of the compressional wave signals with respect to the torpedo;

Increase the effective range of a signal controlled steering system for moving bodies; and Prevent overshooting of the rudder in a signal controlled steering system.

In one illustrative embodiment of this invention, a torpedo comprises a vertical rudder, a horizontal rudder or elevator, two pairs of hydrophones, and a resolving circuit associated with each pair of hydrophones for effective deflection of a corresponding rudder in accordance with signals received by the hydrophones to steer the torpedo toward the source of the signals.

In accordance with one feature of this invention, each resolving circuit comprises an amplifier the output of which is supplied to a rectifier, a resolving network including two similar elements and an impedance, and a switching element for operatively associating the hydrophones of the respective pair with the amplifier in alternation and for connecting the rectifier to the two elements alternately and in synchronism with the association of the hydrophones with the amplifier, whereby each impedance is energized in accordance with the signal intensities at the respective hydrophones.

In accordance with another feature of this invention, the aforenoted elements comprise similar condensers connected in series in a common discharging circuit associated therewith, each condenser being charged proportionately to the signal intensity at a respective hydrophone by way of the amplifier and rectifier.

In accordance with a further feature of this invention, means are provided for steering the torpedo along a generally figure-eight course when the signal intensity at the hydrophones is below a prescribed level.

In accordance with a still further feature of this invention, means are provided for impressing on the resolving circuit a signal for damping operation of the rudder deflecting means.

The invention and the above-noted and other features thereof will be understood more clearly and fully from the following detailed description with reference to the accompanying drawing in which:

FIG. 1 is a perspective view of a torpedo including a signal controlled steering system illustrative of one embodiment of this invention, a portion of the torpedo being broken away to show the location of the hydrophones;

FIG. 2 is a block diagram illustrating the general configuration of and the association of the elements in a steering system constructed in accordance with this invention;

FIG. 3 is a circuit diagram showing details of an illustrative steering system of the configuration shown in FIG. 2; and FIG. 4 is a diagram illustrating, in part, details of the potentiometer bank and, in part, a modification of the steering system shown in FIG. 3.

Referring now to the drawing, the torpedo illustrated in FIG. 1 comprises a cylindrical body 10 in which elements of the control system are mounted, a nose 11 in which an explosive charge is carried and a tail portion 12 on which the vertical and horizontal fins 13 are mounted. Extending rearwardly of the vertical fins is a vertical rudder 14 which comprises two similar parts, as shown, mechanically connected to move in unison. A horizontal rudder or elevator 15 extends rearwardly of the horizontal fins and, like the vertical rudder, comprises two similar parts mechanically connected to move in unison. Each of the vertical and horizontal rudders is deflectable in opposite directions by means described hereinafter in accordance with information derived from the outputs of two pairs of hydrophones 16 and 17, respectively, only one of the hydrophones 16 being shown in FIG. 1.

The hydrophones of each pair are mounted on opposite sides, i.e. port and starboard and top and bottom, of the body, are diametrically aligned and may be of the piezoelectric type and of the construction disclosed in the above-identified application of John C. Steinberg. As disclosed in that application, the torpedo body constitutes a barrier between the hydrophones of each pair so that the relative signal intensities at the hydrophones of each pair are dependent upon the diffraction pattern of the torpedo. The rudder and elevator are deflected in accordance with the difference of the signal intensities at the hydrophones of the respective pair, by a resolving circuit of the general configuration illustrated in FIG. 2.

Generally, the system illustrated in FIG. 2 comprises the vertical rudder 14 which is mounted to be deflected in opposite directions by a motor 18, the rudder being connected to the motor by a suitable drive or gearing, not shown. The motor 18 may be of the series type having a pair of windings 19a and 19b effective, when energized from a suitable supply source 20 by way of the respective contacts of a relay 21, to revolve the motor rotor in opposite directions. The relay is adapted to be energized in accordance with the relative outputs of the horizontal hydrophones 16a and 16b to determine which of the windings 19 is to be energized and thus to determine the direction of deflection of the rudder.

The signals received by the hydrophones 16 are resolved into a control signal for energizing the relay by way of a circuit which comprises generally an input element 22 associated with an amplifier 23 provided with automatic volume control 50, the output of the amplifier being supplied to a rectifier 24.

The rectifier output is supplied to a resolving network 25 from which a control signal is applied to a direct current amplifier 26. The input element 22 circuit and rectifier output circuit are controlled by a switching element 27 in such manner that the two hydrophones 16 are operatively associated with the amplifier 23 in alternation and the rectifier output is supplied to differentially related elements of the resolving network 25 alternately and in synchronism with the alternate association of the two hydrophones with the amplifier 23. The resolving network is effective to combine the outputs of the two hydrophones in such manner as to produce a control signal, related in amplitude and polarity to the relative intensities of the signals at the two hydrophones 16, in accordance with which, in the absence of other controls to be described hereinafter, the direct current amplifier 26 is controlled and relay 21 is operated to cause steering of the torpedo toward that side, i.e. port or starboard, thereof on which the hydrophone receiving the signal of greater intensity is positioned whereby the torpedo is guided toward the source of the signals received by the hydrophones.

In a particularly advantageous construction, the hydrophones are constructed so as to be resonant or especially responsive at a particular frequency, for example 16.5 kilocycles per second, or restricted band of frequencies and the amplifier 23 and input element 22 are designed to be most efficient at this frequency or band of frequencies. The frequency of the switching element 27 advantageously is low in comparison to the frequency to which the hydrophones are tuned. For example, if the hydrophones are resonant at a frequency of 16.5 kilocycles per second, the switching frequency may be of the order of 40 cycles per second.

A specific control system of the configuration illustrated in FIG. 2 is shown in FIG. 3. Each of the hydrophones 16a and 16b has associated therewith a transformer 29a or 29b, respectively, the primary windings of which have associated therewith suitable condensers 30, the impedances of the condensers, windings, hydrophones being correlated so that each combination is tuned to a preassigned frequency, e.g. 16.5 kilocycles per second.

Each hydrophone, if of the piezoelectric type, considered with respect to the grid circuit of the first stage device 37 includes both a series and a shunt capacitance and a series resistance and inductance, the shunt capacitance being several times as large as the series capacitance. The mechanical resonance frequency of the crystal is determined by the inductance and series capacitance. At this frequency, the piezoelectric voltage generated by the crystal is, in effect, in series with the resistance noted and is shunted by the shunt capacitance, the latter having a reactance, in ohms, small, for example of the order of 20 percent, in comparison to the resistance, so that there is a substantial drop across the resistance. The capacitance of the first stage device and of the connecting conductors is in parallel with the shunt capacitance noted and further reduces the shunt reactance. The primary winding of the respective transformer 29 correlated with the shunt capacitance and the device and conductor capacitances to make the combination antiresonant at the resonance frequency of the inductance and series capacitance of the crystal, increases the shunt impedance to a value much greater than the resistance so that the piezoelectric voltage will be transferred to the grid of the first stage device 37 with substantially negligible loss through the series resistance. In some cases simple inductances may be used instead of transformers 29, in which cases the inductances are proportioned to antiresonate the shunt capacitances.

The transformers serve to step down the hydrophone impedance to a value suitable for commutating purposes. The secondary windings of the transformers 29a and 29b have a common terminal connected to ground, as shown, and the other terminal thereof connected to groups 31a and 31b, respectively, of equally spaced, fixed contact segments of the switching element $27_1$, the contact segments of the two groups being arranged in alternate relation. The switching element $27_1$ includes a rotor 32 carrying a contact arm 33 adapted to sweep over the commutator segments 31. The rotor 32 and the contact arm 33 carried thereby may be connected to ground by way of a resistance 34 and are connected also to the input element 23.

The input element comprises a condenser 35 and inductance 36 correlated so that the combination is tuned to the preassigned frequency, e.g. 16.5 kilocycles per second, the element being in the input circuit of the first stage of the amplifier 23. The amplifier 23 comprises three similar electron discharge devices 37 connected in cascade by suitable resistances 38 and condensers 39 and having a common anode supply source 40, suitable resistances 41 being provided in the anode supply circuits. Advantageously, the resistance 38 in the coupling circuit between the first and second stages of the amplifier 23 is variable to enable adjustment of the gain of the amplifier.

The amplifier 23 has its gain controlled by the automatic volume control 50, which comprises an electron discharge device 42 provided with grid bias and anodes batteries 43 and 45, respectively. The grid of the device 42 is connected to the anode of the last stage device 37 of the amplifier 23, by way of a suitable condenser 44. The anode circuit of the device 42 includes a resistance 46 in shunt with a condenser 47, the resistance being connected to the grid circuits of the devices 37 through a high resistance 48. Thus, the grids of the devices 37 are biased at a potential proportional to the anode current of the device 42 and the output of the amplifier 23 is maintained substantially constant.

The output voltage of the amplifier 23 is supplied to the grid circuit of the rectifier 24 by way of a condenser 49, the grid of the rectifier 24 being biased by a suitable battery 50 and the anode of the rectifier being connected to the source 40 through a resistance 51. One end of the resistance 51 is connected to the rotor 52 and rotating contact 53 of the switching elements $27_2$, this element comprising groups 54a and 54b of contact segments arranged to be swept over by the contact 53, the segments of the two groups being arranged in alternate relation. The other end of the resistance 51 is connected to a common terminal of two equal serially connected condensers 55a and 55b, the other terminal of the condenser 55b being connected to a point common to the segments 54b and one terminal of the potentiometer bank 28. The other terminal of the condenser 55a is connected to the contact segments 54a and also to the other terminal of the potentiometer bank 28 through equal resistors 56a and 56b.

The resistors 56a and 56b are included in the grid circuits of the electron discharge devices 57a and 57b of the direct current amplifier 26, the two devices being connected in push-pull relation as shown and provided with grid bias and anode batteries 58 and 59, respectively. The output circuit of the amplifier 26 includes the two balanced differentially arranged windings 60a and 60b of the relay 21, in accordance with the resultant of the currents in which the armature 61 of the relay is deflected to engage one or the other of the contacts 62a or 62b.

The input circuit for the direct current amplifier 26, it will be seen, includes the condensers 55, the resistances 56 and the potentiometer bank 28 connected in series. The direction of the resultant of the currents through the windings 60 and, hence, the direction of deflection of the armature 61 will be dependent, as is apparent, upon the polarity of the potential across the terminals x, y of the input resistors 56 and the polarity of this potential is dependent in turn upon the polarity of the potential appearing across the condensers 55a and 55b in series. As described immediately hereinafter, the potential appearing across the condensers is dependent upon the relative intensities of the signals at the two hydrophones 16a and 16b.

The rotors 32 and 52 of the switching elements $27_1$ and $27_2$, respectively, are revolved at the same rate, as by a motor 63 common thereto. The several groups of contact segments 31a, 31b, 54a and 54b are equal in number. By virtue of rotation of the contact arm 33, the hydrophones 16a and 16b are connected alternately in the input circuit of the amplifier 23. By virtue of rotation of the contact arm 53, the condensers 55a and 55b are connected to the output of the rectifier 24 alternately and in synchronism with the alternate connection of the hydrophones 16 to the amplifier 23. Specifically, the two condensers 55a and 55b are connected in alternation across the resistance 51 in the output circuit of the rectifier 24 and each condenser receives a charge proportional to the potential appearing across the resistance 51 while it is connected thereacross. Inasmuch as, as pointed out above, the switching of the condensers 55 to the rectifier 24 is in synchronism with the switching of the hydrophones 16 to the amplifier 23, it will be seen that the charge received by each condenser is proportional to the signal intensity at the respective hydrophone and that the potential appearing across the two condensers in series in proportional in amplitude and related in polarity to the difference in signal intensities at the two hydrophones. The time constant of the charging circuits for the two condensers 55 is made small so that each condenser receives its full charge qjuickly, and the resistances 56 are made large so that the condensers hold their charges over the commutating cycle. For example, the condensers 55 may be of the order of 0.02 microfarad each, the resistance 51 in the charging circuit may be of the order of 50,000 ohms and the resistances 56 in the discharging circuit may be of the order of 2 megohms each. Thus, if the signal intensity at the hydrophone 16a is greater than that at the hydrophone 16b, the condenser 55a will receive a greater charge than the condenser 55b and the terminal $x$ will be less negative with respect to the mid-point between the two resistances 56 than the terminal $y$.

The currents in the windings 60a and 60b will vary in accordance with the change in potential of the points $x$ and $y$, respectively, with respect to the mid-point between the resistances 56a and 56b and, as noted heretofore, the armature 61 is deflected in accordance with the difference of the currents in the windings to engage either the contact 62a or the contact 62b. Disregarding for the moment potentials appearing across the resistances 56 due to operation of the potentiometer bank 28 in the manner described hereinafter, it will be seen that the armature 61 will engage the contact 62a when the signal intensity at the hydrophone 16a is greater than that at hydrophone 16b and will engage the contact 62b when the signal intensity at hydrophone 16b is the greater. The direction of rotation of the motor is determined accordingly and the rudder 14 is deflected to steer the torpedo toward the side thereof on which the hydrophone receiving the greater signal is positioned. When the torpedo is on course toward the source of the signals, the armature 61 is disengaged from both contacts 62a and 62b and the rudder 14 is in center position. If the torpedo drifts off course, the relay 21 is operated in accordance with the signals received by the hydrophones to steer the torpedo toward the signal. It will be understood, of course, that if the source, e.g. submarine, moves the rudder 14 will be operated so that the torpedo will follow the motion of the source and steer the torpedo to the source.

It will be noted that the two hydrophones 16 are associated with the amplifier 23 and the rectifier 24 on a shared time basis and that the automatic volume control is affected substantially in accordance with the average of the signal voltages obtained from the two hydrophones. Thus, an average gain is established for the amplifier 23 and the control system provides, in effect, two identically controlled transmission channels, one for each of the hydrophones. The rectifier 24 is designed to have a substantially linear rectifying characteristic. It will be appreciated, then, that the control potential appearing across the condensers 55a and 55b in series is proportional to the difference in the signal intensities at the two hydrophones 16 and is substantially independent of the absolute magnitudes of the signal intensities throughout the range in which the volume control is effective. Stated in another way, the signals received by the hydrophones are resolved into a control potential on a relative rather than an absolute magnitude or intensity basis and the control potential obtained is a measure of the difference ratio between the signals at the two hydrophones, substantially independent of the absolute magnitudes of the signals. Hence, stable operation is obtained.

Of course, the parameters of the volume control circuit should be correlated to provide control over the range of signal intensities apt to be encountered in operation of the torpedo. In a particular system, satisfactory control over a 75 decible range of input has been realized.

In a particularly advantageous construction, adjacent ones of the segments 54a and 54b of the switching elements $27_2$ are spaced a greater distance than adjacent segments 31a and 31b of the switching element 27. For example, adjacent segments of the element $27_1$ may be spaced of the order of 10 mils and adjacent segments of the element $27_2$ may be spaced of the order of 150 mils. Hence, each hydrophone will be connected to the amplifier 23 somewhat before the charging circuit for the respective condenser 55 is closed and the condenser charging circuits are opened somewhat before the breaking of the respective hydrophone-amplifier connection. Thus, transient effects associated with the making and breaking of connections between the rotating contact 33 and the segments 31 are substantially dissipated before operation of the switching element $27_2$ upon the condenser charging circuits and distortion of the signal resolution is prevented.

The potentiometer bank 28, illustrated in FIG. 4, provides several controls, a number of which are described in detail in the application Serial No. 491,794, filed June 22, 1943, of Hugh K. Dunn. Generally, it comprises a battery 65, across which a group of potentiometer resistances 66 and 67 and another resistance 68 are connected in parallel. The mid-point of the battery 65 is connected to one terminal of the condenser 55b by way of a resistance 69 in parallel with a condenser 70 and the contact arms of the potentiometers 66 and 67 are connected to the terminal $y$ of the resistance 56.

The contact arm of the resistance 67 is set at a fixed position to provide balance in the input circuits for the devices 57a and 57b, that is so that normally the grids of these devices, are at the same potential and the currents through the windings 60a and 60b are equal. The contact arm of the potentiometer 66 is mechanically coupled to the rudder 14 and is arranged so that it is at its center position when the rudder is at its center position. When the rudder is deflected to one side or the other the contact arm of the potentiometer 66 moves to one side or the other of its center position a distance proportional to the deflection of the rudder. Inasmuch as, as noted heretofore, the resistances 56 are high, the time constant of the circuit including these resistances and the condensers 55 is large in comparison to the period of the switching by the switching element $27_2$. Hence, with respect to currents flowing in the input circuit of the amplifier 26 due to movement of the contact arm of the potentiometer 66 from its center position, the condensers present a very small impedance so that substantially the entire potential introduced in this circuit by such movement of the contact arm appears across the terminals $x$, $y$ of the input resistances 56. The polarity of this potential is dependent upon the direction of movement of the contact arm, which in turn is determined by the direction of the rudder deflection. Consequently, the potentiometer 66 tends to establish balance in the input circuits of the direct current amplifier devices 57 and a substantially continuous steering effect is realized.

In order to compensate for momentum of the motor rotor and thus prevent overshooting of the rudder deflection means may be provided for damping the motor operation. Similar auxiliary relays are provideed to be controlled by the relay 21, each of the auxiliary relays comprising a winding 71a or 71b, two armatures 72a and 73a or 72b and 73b, and contacts 74a and 75a or 74b and 75b associated with the respective armatures. As is apparent from the drawing, operation of the relay 21 determines which of the auxiliary relays operates. When either auxiliary relay operates both of its armatures engage their associated contacts, the armature 72 and contact 74 closing the motor circuit to the source 20. The armature 73 and contact 75 which engage determine the polarity of the potential drop appearing across the resistance 69 and introduced into the input circuit of the direct current amplifier. For example, if the armature 61 engages the contact 62a, the relay winding 71a is energized and the armature 73a engages the contact 75a. Thus, a circiut is closed from the positive terminal of the battery 65, through resistance 76a, armature 73a and contact 75a and thence to the lower end of the resistance 69. Similarly, when the armature 61 engages the contact 62b, the winding 71b is energized and the armature 73b engages the contact 75b and a circuit is completed from the negative terminal of the battery 65, through the resistance 76b, contact 75b and armature 73b to the lower end of the resistance 69.

The polarity of the potential drop across the resistance 69 is determined, thus, by which of the auxiliary relays operates, the connection being such that it adds to that introduced in the circuit by operation of the potentiometer 66 and, hence, reduces the time requisite for the restoration of balance in the input circuit of the direct current amplifier 26. Thus, for a very short interval of operation of relay 21 the motor is not able to build up much momentum and condenser 70 does not have time to build up much voltage and hence there is little advance correction. For a larger unbalance requiring greater correction relay 21 operates for a longer period, motor 18 builds up a large momentum. Condenser 70 had time to build up a large charge which acts to restore balance so that when relay 21 is released and motor 18 coasts to a stop carrying the arm of potentiometer 66 beyond the point at which it was when relay 21 opened the advance balancing voltage across condenser 70 will be discharged through resistance 69 and the circuit will be nearer a balance than if the condenser circuit had not been provided. This in effect provides a damping action to the rudder motor 18. The amount of the damping produced can be adjusted to any desired amplitude by varying the capacitance of the condenser 70 and the resistances 69 and 76.

In some cases, the torpedo may be launched, as from an aeroplane, at such a distance from the target, e.g. submarine, that the signal intensities at the hydrophones 16 are insufficient to cause operation of the rudder control system in accordance with the signals. In such cases, means may be provided for causing the torpedo to traverse a circular or other non-linear course in the absence of receipt of a signal of sufficient or prescribed intensity by the hydrophones 16. Conveniently this may be accomplished by modifying the rudder control system. As shown in FIG. 4, the resistance 68 is bridged across the battery 65 and a central portion of this resistance is connected across the contacts 77a and 77b of a time sequence switch having an armature 78. The armature 78 is connected to the contact arms of the bias and follow-up potentiometers 67 and 66, respectively, by way of a variable resistor 79 and a relay 80, the operation of which is controlled by the automatic gain control.

As shown in FIG. 3, the winding of the relay 80 is connected in the output circuit of an electron discharge device 82, the control grid of which is connected to an intermediate point on the battery 43. The potential of this grid at any time is dependent upon the potential drop across the resistance 46 in the output circuit of the automatic volume control device 42, as will be apparent from the drawing. When the output current of the device 42 increases, the bias on the grid of the device 82 decreases and when the prescribed signal intensity at the hydrophones 16 is reached, the device 82 operates the relay 80 and disconnects the armature thereof from the potentiometer circuit.

When the signals received by the hydrophones 16a and 16b are below a prescribed level, the resistance 68 operates to produce an unbalance in the input circuit for the direct current amplifier devices 57, the direction of the unbalance being dependent upon which of the contacts 77a or 77b is engaged by the armature 78. The armature may be positioned to normally engage one of these contacts so that, in the absence of a signal of at least a prescribed intensity at the hydrophones 16 the torpedo will be steered along a circular path. The diameter of this path may be set at a desired length by adjustment of the resistance 79. If, while following this path, the torpedo reaches a position where signals of sufficient intensity are received by the hydrophones 16, the relay 80 operates to disable the circling control and the torpedo is then steered in accordance with the relative intensities of the signals at the two hydrophones 16a and 16b in the manner described hereinabove.

The contact arm 78 of the time sequence switch may be connected mechanically, as by suitable gearing, to the shaft of the propeller in such manner that after a predetermined number of revolutions of the propeller it is deflected from engagement with one of the contacts 77a or 77b into engagement with the other contact and, thus, the direction of unbalance in the input circuit of the direct current amplifier is reversed periodically. Hence, by proper correlation of the propeller rate and the deflection of the armature, the torpedo may be steered along a figure-eight path. Of course, if at any position of the torpedo in this path, the signals received by the hydrophones are of at least a prescribed intensity, the relay 80 operates to disconnect the armature 78 from the potentiometer circuit and the torpedo is thenceforth steered in accordance with the hydrophone signals as resolved in the rudder control circuit.

It will be understood, of course, that the sensitivities of the signal control and the several potentiometer controls may be adjusted to any desired relation. The signal control sensitivity may be adjusted by varying the resistance 51 in the charging circuits for the condensers 55 or the resistance 100. The follow-up sensitivity may be adjusted by providing a suitable resistance 101 in the contact arm circuit thereof.

The system illustrated in FIG. 3 has been described for control of the operation of the rudder 14. A similar circuit with the circling or FIG. 8 control omitted may be employed for controlling the operation of the elevator 15. The relative sensitivities of the two systems employed in a torpedo may be adjusted by varying the resistance 34 in the input circuit for the respective amplifier 23.

Although specific embodiments of this invention have been shown and described, it will be understood, of course, that they are but illustrative and that various modifications may be made therein without departing from the scope and spirit of this invention as defined in the appended claims.

What is claimed is:

1. A signal controlled steering system for a moving body comprising a rudder, a pair of signal translating devices, a resistance, means for deflecting said rudder in opposite directions in accordance with the polarity of the potential appearing across said resistance, and means for converting the outputs of said devices into a potential impressed across said resistance, said converting means comprising a pair of condensers associated with said resistance to discharge therethrough in opposition and means for charging each of said condensers in accordance with the output of a corresponding one of said translating devices.

2. A signal controlled steering system for a moving body comprising a rudder, a pair of signal translating devices, a pair of condensers, means for charging one of said condensers proportionally to the signal intensity at one of said devices, means for charging the other of said condensers proportionally to the signal intensity at the other of said devices, means for resolving the charges received by said condensers into a direct current control signal proportional to the difference in the signal intensities at said devices, and means for deflecting said rudder in opposite directions in accordance with said control signal.

3. A signal controlled steering system for a moving body comprising a rudder, a pair of substantially identical microphones, a pair of substantially identical condensers, a charging circuit for each of said condensers, means for supplying to the charging circuit for one of said condensers a current proportional to the intensity of signals received by one of said microphones, means for supplying to the charging circuit for the other condenser a current equally proportional to the intensity of signals received by the other of said microphones, a differentially operable device for controlling the direction of deflection of said rudder, and means for actuating said device in accordance with the difference in the charging currents supplied to said condensers.

4. A sonically guided torpedo comprising a rudder, a pair of substantially identical hydrophones, reversible driving means for deflecting said rudder in opposite directions, and means for controlling said driving means in accordance with the difference in signal intensities at said hydrophones, said controlling means comprising a differential relay for controlling said driving means, an energizing circuit for said relay including a pair of substantially identical condensers connected in series, means for charging one of said condensers in one direction proportionately to the signal intensity at one of said hydrophones, and means for charging the other of said condensers in the opposite direction and proportionately to the signal intensity at the other of said hydrophones.

5. A signal controlled steering system for moving bodies comprising a rudder, means for deflecting said rudder in opposite directions, a pair of signal translating devices, and means for actuating said deflecting means to deflect said rudder in one direction when the signal intensity at one of said devices is greater than that at the other device and to deflect said rudder in the opposite direction when the signal intensity at said other device is the greater, said last means comprising a pair of condensers, a common discharging circuit for said condensers, a charging circuit for one of said condensers including one of said devices, a charging circuit for the other of said condensers and including the other of said devices, and means for controlling said deflecting means in accordance with the difference in the potentials established in said discharging circuit by said condensers.

6. A signal controlled steering system for moving bodies comprising a rudder, reversible driving means for deflecting said rudder in opposite directions, differential means for determining the direction of energization of said driving means, a pair of signal translating devices, and means for operating said differential means in accordance with the relative signal intensities at said devices, said operating means comprising a direct current amplifier having an output circuit including the energizing element of said differential means and having an input circuit including a pair of condensers, means for charging one of said condensers proportionately to the signal intensity at one of said devices, and means for charging the other of said condensers proportionately to the signal intensity at the other of said devices, said condensers being arranged to discharge in opposition whereby the potential impressed upon said input circuit by said condensers in combination is proportional to the difference in the signal intensities at said translating devices.

7. A signal controlled steering system for moving bodies comprising a rudder, a reversible driving means for deflecting said rudder in opposite directions, means for controlling the direction of operation of said driving means including a differential relay, a pair of signal translating devices, and means for operating said relay in accordance with the relative signal intensities at said devices, said last means comprising a push-pull direct current amplifier, said relay being energized by the output of said amplifier, the input circuit of said amplifier including a biasing resistance, a pair of condensers, means for charging one of said condensers proportionately to the signal intensity at one of said devices, and means for charging the other of said condensers proportionately to the signal intensity at the other of said devices, said condensers being connected to said resistance and arranged to discharge therethrough in opposition.

8. A torpedo comprising a rudder, a reversible motor for deflecting said rudder in opposite directions, a differential relay for controlling the direction of rotation of said motor, and means for operating said relay in accordance with compressional wave signals emanating from an object to steer the torpedo toward said object, said means comprising a direct current amplifier including a pair of electron discharge devices having control electrodes and arranged in push-pull relation, said relay being associated with said amplifier and energized by the output thereof, a biasing resistance bridged between said control electrodes, a circuit bridged across said resistance and comprising a pair of condensers connected in series, a pair of hydrophones, means for amplifying the output of each of said hydrophones, means for rectifying the amplified output of each of said hydrophones, and means coupling said condensers to said rectifying means to charge each of said condensers in accordance with the rectified output of a corresponding one of said hydrophones.

9. A signal controlled steering system for a moving body comprising a rudder, reversible driving means for deflecting said rudder in opposite directions, means for determining the direction of operation of said driving means, and means for operating said direction determining means in accordance with signals emanating from an object to steer the body toward said object, said operating means comprising a pair of signal translating devices, means for amplifying the outputs of said devices, means for rectifying the amplified outputs of said devices, a pair of condensers, means coupling said condensers to said rectifying means to charge each of said condensers proportionately to the rectified output of a corresponding one of said devices, means for resolving the charges received by said condensers into a direct current potential the polarity of which is dependent upon the relative magnitude of said charges, and means for actuating said direction determining means in accordance with the polarity of said potential.

10. A signal controlled steering system for a moving body comprising a rudder, means for deflecting said rudder in opposite directions, means for controlling said deflecting means to determine the direction of deflection of said rudder, a pair of signal translating devices, and means for operating said controlling means in accordance with the relative intensities of signals received by said translating devices, said operating means comprising an amplifier, means for connecting each of said devices to the input of said amplifier, a pair of resolving elements, means for connecting said resolving elements to the output of said amplifier, means for controlling said first and second connecting means to operatively associate said devices alternately with said amplifier and to operatively associate said elements with said amplifier alternately and in synchronism with the operative association of said devices with said amplifier, means for combining the outputs of said elements in opposition, and means for operating said controlling means in accordance with the resultant of said outputs of said elements.

11. A signal controlled steering system for a moving body comprising a rudder, a pair of signal translating devices, means for deflecting said rudder in opposite directions, means for actuating said deflecting means, and means for controlling said actuating means in accordance with the relative signal intensities at said devices, said controlling means comprising an amplifier, means for connecting said devices to the input of said amplifier, resolving means including a pair of condensers, means for connecting said resolving means to the output of said amplifier, means for controlling said first and second connecting means to operatively associate said devices alternately with said amplifier and to operatively associate said condensers with said amplifier alternately and in synchronism with the association of said devices with said amplifier whereby each condenser is charged in accordance with the output of a corresponding one of said devices, said resolving means including a resistance through which said condensers discharge in opposite directions, and means for energizing said actuating means in accordance with the polarity of the potential across said resistance.

12. A signal controlled system comprising a utility, relay means controlling the operation of said utility, an energizing circuit for said relay means including a signal resolving element comprising a resistance the polarity of the potential drop across which determines the direction of energization of said relay means, said element comprising also a pair of condensers connected to said resistance and arranged to discharge therethrough in opposition, a pair of signal translating devices, and means for a charging each of said condensers in accordance with the output of a corresponding one of said devices.

13. A signal controlled system in accordance with claim 12 wherein said charging means comprises an amplifier, means for connecting each of said translating devices to the input of said amplifier, means for connecting each of said condensers to the output of said amplifier, and means for controlling said first and second connecting means to operatively associate said devices with said amplifier alternately and to operatively associate said condensers with said amplifier alternately and in synchronism with the association of said devices with said amplifier.

14. A signal controlled system in accordance with claim 12 wherein said charging means comprises an amplifier, means for connecting each of said translating devices to the input of said amplifier, charging circuits, one for each of said condensers including rectifier means energized by the output of said amplifier, means for controlling said connecting means to operatively associate said devices with said amplifier alternately, and means controlling said charging circuits to associate said circuits operatively with said amplifier in alternation and in synchronism with the association of said devices with said amplifier.

15. A sonically guided torpedo comprising a rudder, reversible driving means for deflecting said rudder in opposite directions, a relay for determining the direction of operation of said driving means, an energizing circuit for said relay including a direct current amplifier, an input circuit for said amplifier including a biasing resistance and a pair of condensers in circuit with said resistance and arranged to discharge therethrough in opposition, a pair of hydrophones, and means for charging each of said condensers proportionately to the output of a corresponding one of said hydrophones, said charging means comprising an alternating current amplifier, means for connecting each of said hydrophones to the input of said second amplifier, a charging circuit for each of said condensers and including a rectifier, means for connecting each charging circuit to the output of said second amplifier, and means for controlling said first and second connecting means to operatively associate said hydrophones with said second amplifier alternately and to operatively associate said charging circuits with said second amplifier alternately and in synchronism with the association of said hydrophones with said amplifier.

16. A torpedo comprising a rudder, driving means for deflecting said rudder in opposite directions, relay means for controlling said driving means to determine the direction of deflection of said rudder thereby, energizing means for said relay means including a direct current amplifier, said amplifier having an input circuit including a biasing resistance and a source of potential, a pair of signal translating devices, means for resolving the outputs of said devices into a potential impressed across said resistance and related in polarity and magnitude to the relative amplitude of the outputs of the two devices, a damping resistance, a condenser in parallel with said damping resistance, and means actuated by said relay means for connecting said damping resistance and condenser across portions of said source in opposite directions in accordance with the direction of deflection of said rudder.

17. In combination, a pair of signal translating devices, an amplifier, means for connecting each of said devices to the input of said amplifier, rectifier means connected to the output of said amplifier, a resistance, a pair of condensers arranged to discharge through said resistance in opposition, a charging circuit for one of said condensers, a charging circuit for the other of said condensers, each of said charging circuits including said rectifier means, means for operating said connecting means to connect said devices to said amplifier alternately, and means for closing said charging circuits alternately and in synchronism with the alternate connection of said devices to said amplifier.

No references cited.

SAMUEL FEINBERG, *Primary Examiner.*

FRED C. MATTERN, JR., BURHAM YUNG, KAWI,
*Examiners.*